US005156500A

United States Patent [19]

Pianegonda

[11] Patent Number: 5,156,500

[45] Date of Patent: Oct. 20, 1992

[54] APPLIANCE FOR THE DECANTATION AND RECOVERY OF POWDERY PRODUCTS IN PNEUMATIC CONVEYORS

[75] Inventor: Francesco Pianegonda, Brescia, Italy

[73] Assignee: Skyway Development Limited, Guernsey, United Kingdom

[21] Appl. No.: 595,188

[22] Filed: Oct. 10, 1990

[30] Foreign Application Priority Data

Oct. 12, 1989 [IT] Italy ................................ 5213 A/89

[51] Int. Cl.[5] ........................ B65G 53/60; B01D 45/16

[52] U.S. Cl. ...................................... 406/173; 55/218; 55/459.5

[58] Field of Search ................................ 209/142-144, 209/146, 147; 55/218, 393, 459.1, 459.5; 406/168, 169, 173

[56] References Cited

U.S. PATENT DOCUMENTS

| | | | |
|---|---|---|---|
| 2,068,459 | 1/1937 | Monaghan | 55/459.1 X |
| 2,354,311 | 7/1944 | Harlow | 209/144 |
| 2,624,460 | 1/1953 | Parten | 209/154 X |
| 2,714,533 | 8/1955 | Arquint | 406/169 X |
| 3,024,908 | 3/1962 | Ibing et al. | 209/144 |
| 4,900,345 | 2/1990 | le Jeune | 209/144 X |

FOREIGN PATENT DOCUMENTS

| | | | |
|---|---|---|---|
| 0156869 | 9/1939 | Austria | 209/144 |
| 0802212 | 10/1958 | United Kingdom | 209/144 |

*Primary Examiner*—Michael S. Huppert
*Assistant Examiner*—Edward M. Wacyra
*Attorney, Agent, or Firm*—McGlew & Tuttle

[57] ABSTRACT

Appliance to decant and recover powdery products in pneumatic conveyors, where air is tangentially driven into an annular passage inside a body, where it is subject to an expansion of the product and which it leaves through a conduit and an outlet pipe. The separated product is collected in a conical bottom part of the body for its recovery.

7 Claims, 2 Drawing Sheets

APPLIANCE FOR THE DECANTATION AND RECOVERY OF POWDERY PRODUCTS IN PNEUMATIC CONVEYORS

FIELD AND BACKGROUND OF THE INVENTION

The invention concerns an appliance allowing the decantation and even selective recovery of powdery products in pneumatic conveyors.

SUMMARY AND OBJECTS OF THE INVENTION

It is the main object of the invention to provide a simple and efficient appliance to be inserted along a pipeline where an air flow is transporting powders, floury substances and the like in order to ease the decantation and separation of said powdery products before the air passes into a cyclofilterventilator. Another object of the invention is to make available a decanting appliance to be connected with other appliances of the same kind but having different dimensions in order to precipitate powdery products of different consistence and/or properties for a more rational removal of the particles in suspension in the air flow to be treated.

The here proposed decanting appliance is substantially corresponding to the appliance claimed here under. It will however be described in all its details in the following specification referring to the enclosed drawing showing an embodimento of the invention, where:

DETAILED DESCRIPTION OF THE PREFERRED EMBODIMENT

Figure 1:
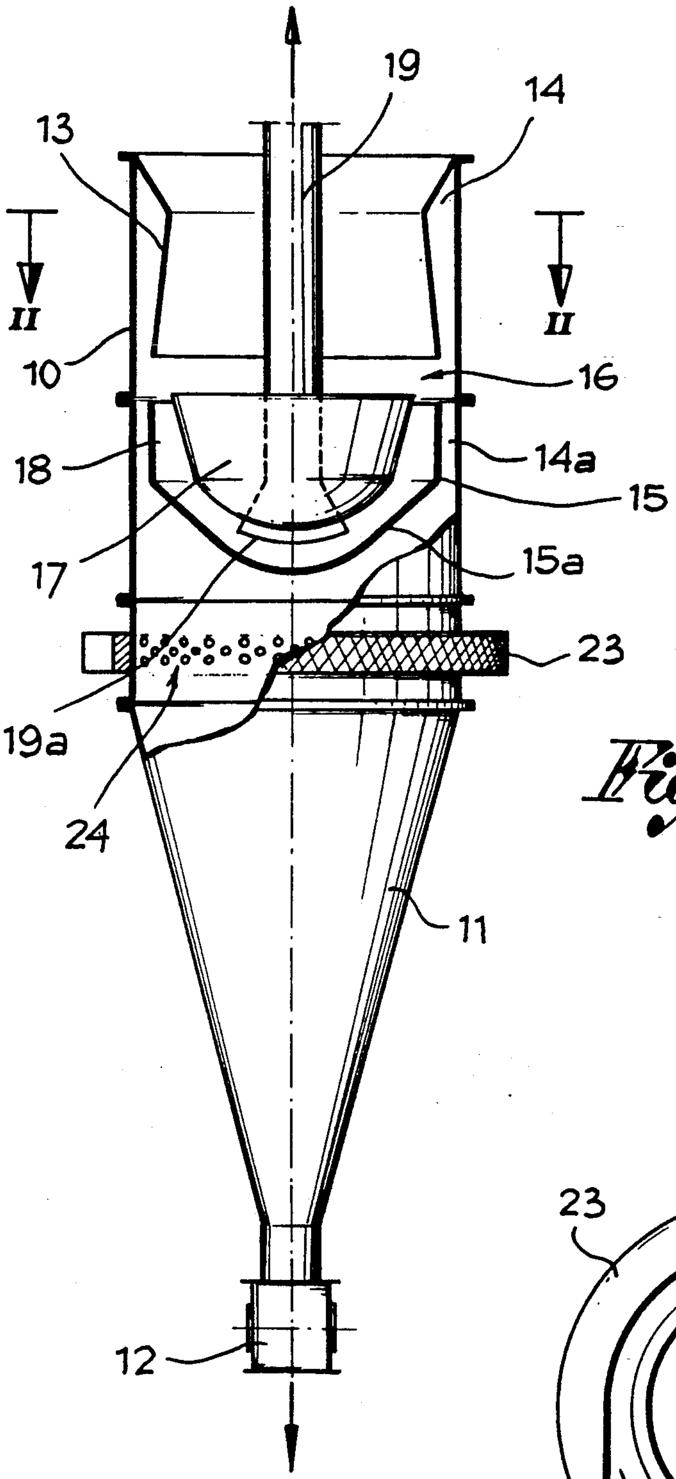
FIG. 1 is a partially sectional view of the appliance.
Figure 2:
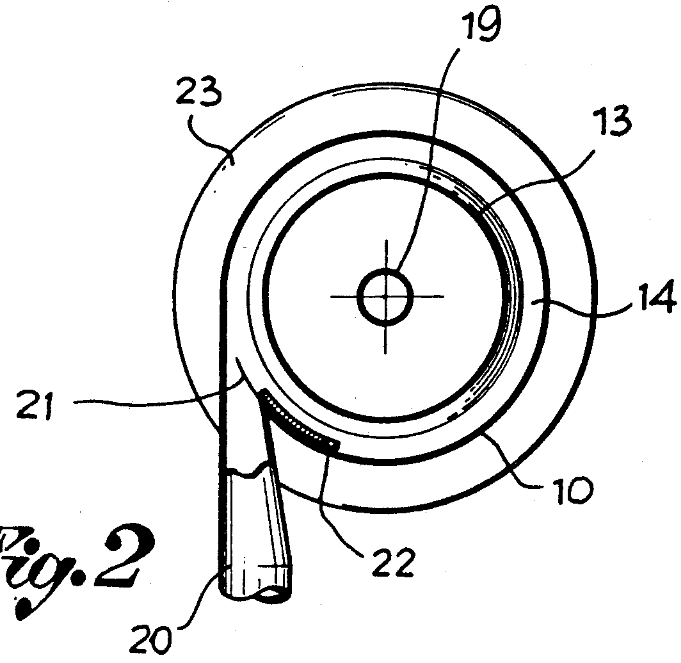
FIG. 2 is a sectional view taken along the line defined by arrows II—II in FIG. 1.

The proposed appliance comprises a cylindrical hollow body 10, which may consist of several superimposed and flanged sections, completed by a tapered and hopper like bottom part 11 fitted with a leakproof star type discharge valve 12. Inside body 10 a concentrically fixed liner 13 extending along the top section of said body is delimiting an annular passage 14 enclosed between its outer wall and the inside wall of the body, which is closed on top and open towards the bottom and featuring a variable section. Still inside body 10 and under liner 13 a stationary vessel 15 is mounted. Between the rim of vessel 15 and the liner 13 a passage 16 connects the annular passage 14 with the vessel itself. On the other hand, the outer wall of vessel 15 is detached from body 10 thus enclosing an annular passage **14*a* communicating with passage 14 between body 10 and liner 13**.

Figure 3:
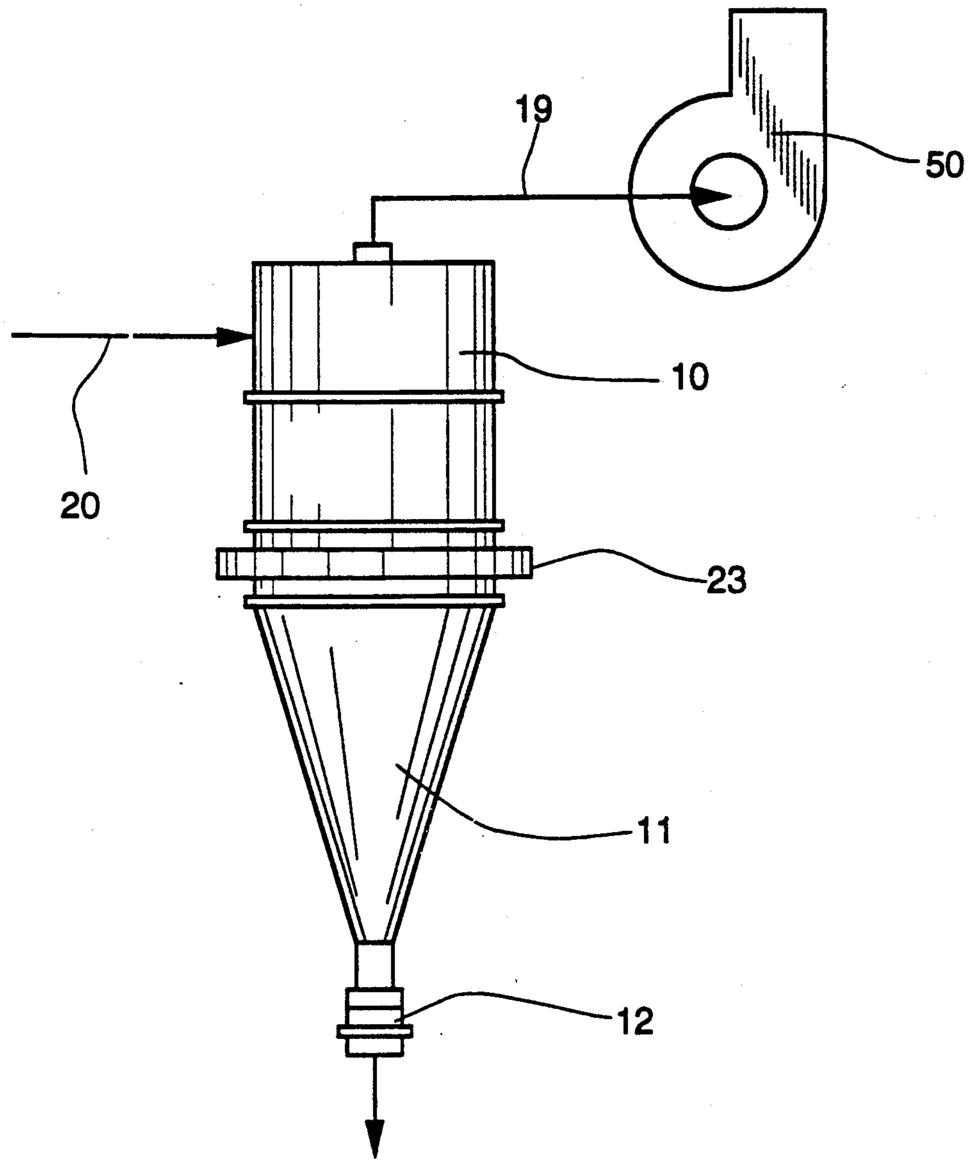
FIG. 3 is a schematic representation of the appliance with connected cyclofilterventilator.

The bottom **15*a* of vessel 15 is substantially conical and inside said vessel a concentric flow regulator 17 is delimiting an outlet conduit 18 extending from the rim of said vessel to its bottom. The flow regulator 17 is fitted with a pipe 19 with a preferably flared bottom outlet 19*a*, while its upper end is extending towards another (not shown) appliance or towards a cyclofilterventilator 50 (see FIG. 3). The flow regulator 17 with its pipe 19, 19*a*** is vertically adjustable so as to modify the section of the outlet conduit.

At the height of liner 13 a conduit 20 is tangentially fitted on body 10, to take the air flow in a tangential direction into the decanting appliance. Its inlet port 21 is however fitted with a gate 22 to be operated either manually or automatically to adjust inlet section and angle of the air flow and its expansion inside the appliance.

Finally, a rotating ring 23 or any other suitable means to vary the opening of the lateral ports 24 letting in some more air when it is required and necessary, may be mounted on said cylindrical body 10.

In practice, the air transporting the powdery product tangentially enters the top section of the cylindrical body 10 and circulates inside the annular passage 14. The expansion and cyclonic behaviour of the air inside said passage cause the descent of the heavier particles which thus pass through passage **14*a* and are collected in the tapered bottom body 11, from where they can be discharged through the star type valve 12. The air itself, passing through channel 16, flows through conduit 18 entraining any product residues or dust eventually deposited in the container to pass, through pipe 19 and by aspiration, into a conventional cyclofilterventilator 50**.

The expansion of the entering air may be adjusted, in order to modify the decanting conditions of the product, by means of gate 22, while by vertically adjusting the flow regulator 17 the section of the outlet conduit 18 can by changed according to the product to be recovered.

Finally, by acting on ring 23 some additional air may be fed through ports 24, as may be necessary in some cases to increase the quantity of product to take to the cyclofilter 50 or to any following equipment, said air being in any case recovered through a not shown conduit from the dome of the cyclofilter 50.

I claim:

1. An appliance for the decantation and recovery of powdery products in pneumatic conveyors, the appliance comprising:
   - a cylindrical body;
   - hopper means, including a tapered bottom for bulk delivery of material, said bottom having a star-type discharge valve;
   - a liner positioned within said cylindrical body, cooperating with said cylindrical body to delimit a first annular passage, said passage being closed on top and open toward a bottom below said liner;
   - a vessel with an outer wall detached from said body so as to form a second annular passage communicating with said first annular passage between said liner and said body, said vessel having a conical bottom mounted concentrically with respect to said cylindrical body;
   - a movable flow regulator concentrically mounted within said vessel and cooperating with said vessel to delimit an outlet conduit, said outlet conduit extending from a rim to a bottom of said vessel and communicating with said first annular passage through a passage enclosed between said liner and said rim of said vessel;
   - a conduit tangentially fitted to said cylindrical body at a height of said first annular passage to feed air flow to be treated;
   - an outlet pipe fixed to said flow regulator, said outlet pipe opening towards a bottom of said vessel; and
   - a cyclofilterventilator connected to said outlet pipe.

2. An appliance according to claim 1 wherein said liner extends along an upper section of said cylindrical body, said first annular passage being provided with a variable cross-section.

3. An appliance according to claim 2, wherein said flow regulator and said outlet pipe are vertically adjustable in order to vary a cross-sectional area of said outlet conduit.

4. An appliance according to claim 1, wherein said flow regulator and said outlet pipe are vertically adjustable in order to vary a cross-sectional area of said outlet conduit.

5. An appliance according to claim 1, wherein said air inlet conduit includes a manually or automatically operated gate for varying an inlet angle and cross-section of air entering the appliance.

6. An appliance according to claim 1, wherein said cylindrical body includes intake ports provided for admission of additional air and movable closing means to open and close said ports.

7. An appliance according to claim 1, wherein air flow entering through inlet conduit is directed to pass into said first annular passage allowing expansion and cyclonic motion for separation of the transported product from the air flow, whereby the air flow without the entrained transported product passes to the outlet conduit and the discharge pipe and the separated product is collected in said tapered bottom part and removed by opening said discharge valve.

* * * * *